United States Patent
Kaki et al.

(10) Patent No.: US 11,425,262 B2
(45) Date of Patent: Aug. 23, 2022

(54) SPLIT CONTROL AND DATA PLANE ARCHITECTURE TO ENABLE RATING GROUP-LEVEL THRESHOLDS AND TRIGGERS FROM CHARGING FUNCTION FOR OFFLINE CHARGING

(71) Applicant: Cisco Technology, Inc., San Jose, CA (US)

(72) Inventors: Somaraju Kaki, Karnataka (IN); Ravi Sankar Mantha, Bangalore (IN); Mukesh Yadav, Bangalore (IN); Sandeep Dasgupta, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 113 days.

(21) Appl. No.: 16/774,546

(22) Filed: Jan. 28, 2020

(65) Prior Publication Data

US 2021/0234965 A1 Jul. 29, 2021

(51) Int. Cl.
*H04M 15/00* (2006.01)
*H04W 84/04* (2009.01)

(52) U.S. Cl.
CPC ........... *H04M 15/65* (2013.01); *H04M 15/62* (2013.01); *H04M 15/66* (2013.01); *H04M 15/8072* (2013.01); *H04W 84/042* (2013.01)

(58) Field of Classification Search
CPC ...... H04M 15/65; H04M 15/62; H04M 15/66; H04M 15/8072; H04W 84/042
See application file for complete search history.

(56) References Cited

U.S. PATENT DOCUMENTS

| | | | |
|---|---|---|---|
| 7,940,904 B2 | 5/2011 | Cai et al. | |
| 9,479,917 B1* | 10/2016 | Gota | H04M 15/8228 |
| 2009/0264096 A1* | 10/2009 | Cai | H04L 12/1446 |
| | | | 455/406 |
| 2019/0207778 A1* | 7/2019 | Qiao | H04M 15/61 |
| 2020/0100075 A1* | 3/2020 | Chai | H04M 15/65 |
| 2020/0204685 A1* | 6/2020 | Chai | H04M 15/66 |

OTHER PUBLICATIONS

3GPP, "3rd Generation Partnership Project; Technical Specification Group Services and System Aspects; Telecommunication management; Charging management; 5G system, charging service; Stage 3 (Release 16)", 3GPP TS 32.291 V16.2.0, Dec. 2019, 117 pages.

(Continued)

*Primary Examiner* — Pakee Fang
(74) *Attorney, Agent, or Firm* — Edell, Shapiro & Finnan, LLC

(57) ABSTRACT

A network element configured to support charging for a service in a network accesses policy rules defining a rating group to be used for offline charging. While a protocol data unit (PDU) session for user equipment is being established in the network, the network element sends, to a charging function configured to send charging data records related to service usage to a billing domain, a charging data request that establishes offline charging for the PDU session and indicates the rating group. The network element also receives, from the charging function, a charging data response including one or more triggers and thresholds for the rating group for the offline charging.

20 Claims, 7 Drawing Sheets

(56) References Cited

OTHER PUBLICATIONS

3GPP, "3rd Generation Partnership Project; Technical Specification Group Services and System Aspects; Telecommunication management; Charging management; Charging architecture and principles (Release 16)", 3GPP TS 32.240 V16.1.0, Dec. 2019, 61 pages.

3GPP, "3rd Generation Partnership Project; Technical Specification Group Services and System Aspects; Telecommunication management; Charging management; 5G system; Services, operations and procedures of charging using Service Based Interface (SBI) (Release 16)", 3GPP TS 32.290 V16.3.0, Dec. 2019, 34 pages.

3GPP, "3rd Generation Partnership Project; Technical Specification Group Services and System Aspects; Telecommunication management; Charging management; 5G data connectivity domain charging; stage 2 (Release 15)", 3GPP TS 32.255 V15.5.0, Dec. 2019, 68 pages.

\* cited by examiner

| ATTRIBUTE NAME | DATA TYPE | P | CARDINALITY | DESCRIPTION | APPLICABILITY |
|---|---|---|---|---|---|
| ratingGroup | RatingGroup | M | 1 | The identifier of a rating group. | |
| requestedUnit | RequestedUnit | $O_c$ | 0..1 | This field indicates, if included, that quota management is required. It may additionally contain the amount of requested service units for a particular category. | |
| usedUnitContainer | array(UsedUnitContainer) | $O_c$ | 0..N | This field contains the amount of used non-monetary service units measured. | |

FIG. 7

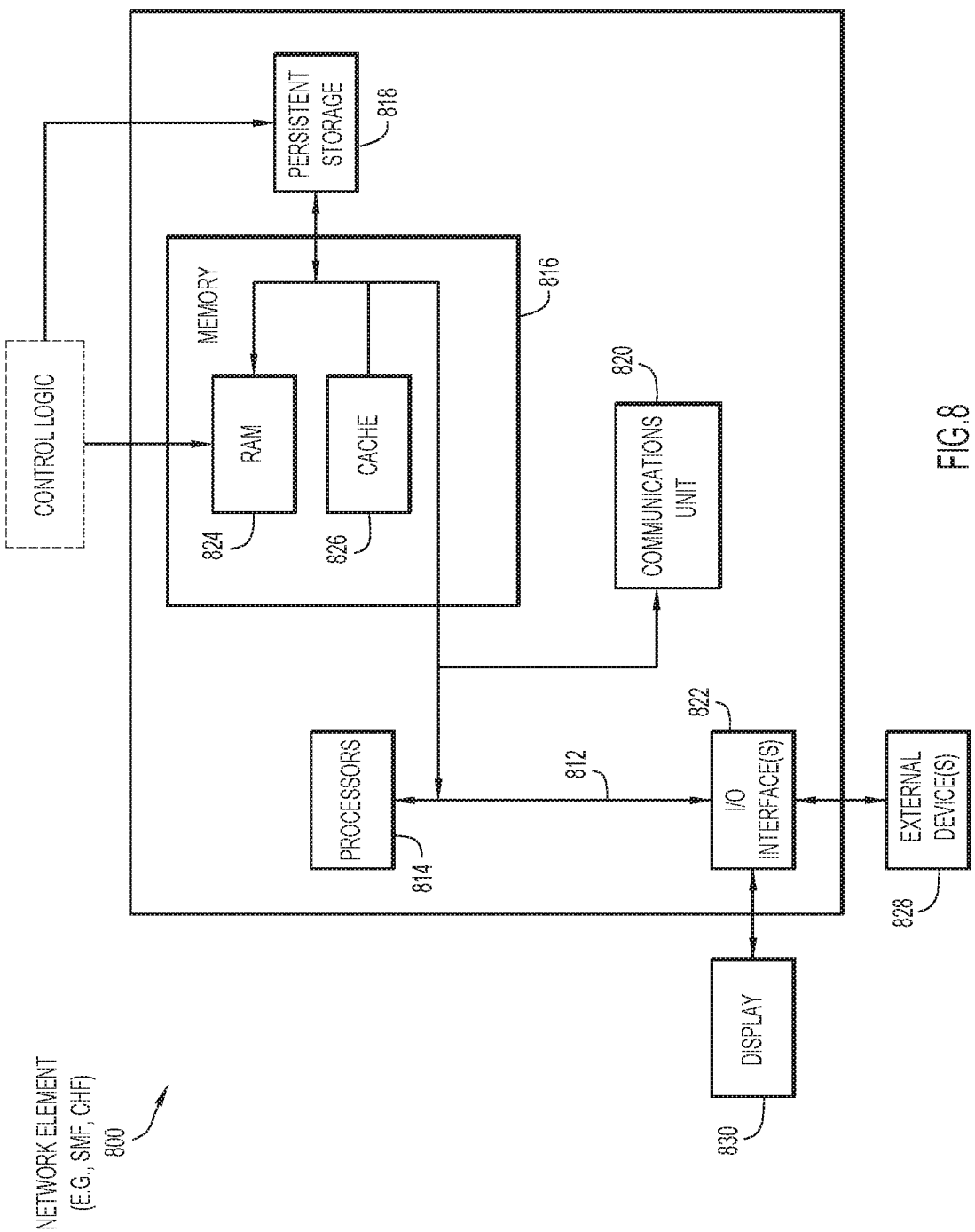

SPLIT CONTROL AND DATA PLANE ARCHITECTURE TO ENABLE RATING GROUP-LEVEL THRESHOLDS AND TRIGGERS FROM CHARGING FUNCTION FOR OFFLINE CHARGING

TECHNICAL FIELD

The present disclosure relates to enable offline charging for rating groups in a network.

BACKGROUND

The term "charging" as defined under the 3$^{rd}$ Generation Partnership Project (3GPP) specifications/standards (collectively referred to as the "3GPP specifications") generally refers to generating information related to usage of a service by user equipment (UE) during a protocol data unit (PDU) session, and that is used to bill a subscriber for that usage under various charging scenarios. The 3GPP specifications refer to a charging function (CHF) that supports both offline and online charging for the PDU session, and also define a construct referred to as a "rating group" (RG) to group together and identify similar services for purposes of the charging. The 3GPP specifications further define "charging events" for purposes of billing during the PDU session, and various "triggers" and "thresholds" associated with the charging events. Disadvantageously, the current 3GPP specifications expose a coverage gap in that they do not enable the CHF to provision the triggers and thresholds at the granularity or level of rating groups (RGs) for offline charging, when the PDU session is first established. This results in missed billing opportunities and revenue for offline charging, and/or complex workarounds.

BRIEF DESCRIPTION OF THE DRAWINGS

FIG. 7 is an illustration of an example multipleUnitUsage information element (IE), according to an example embodiment.

FIG. 8 is an illustration of a hardware block diagram of a computing device that may perform the functions of any of the servers or computing or control entities/network elements referred to herein, according to an example embodiment.

DESCRIPTION OF EXAMPLE EMBODIMENTS

Overview

Figure 1:
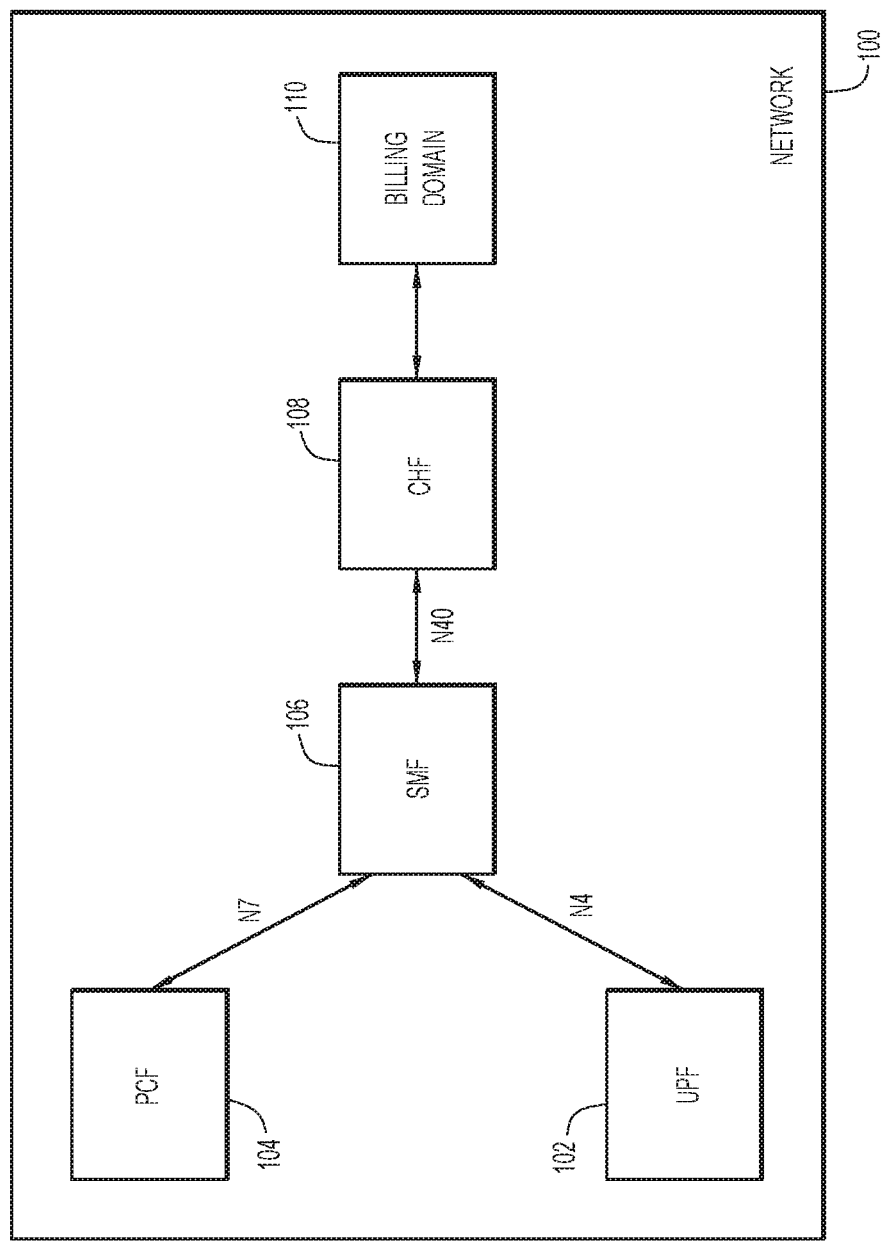
FIG. 1 is a block diagram of an example converged charging architecture for both online and offline charging in a network, according to an example embodiment.

A network element configured to support charging for a service in a network accesses policy rules defining a rating group to be used for offline charging. While a protocol data unit (PDU) session for user equipment is being established in the network, the network element sends, to a charging function configured to send charging data records related to service usage to a billing domain, a charging data request that establishes offline charging for the PDU session and that indicates the rating group. The network element also receives, from the charging function, a charging data response including one or more triggers and thresholds for the rating group for chargeable evens for the offline charging.

Example Embodiments

The 3GPP standards define online and offline charging. Offline charging is a process in which charging information does not affect, in real-time, the service(s) rendered by a network during a protocol data unit (PDU) session. For offline charging, a network element, such as a session management function (SMF) with an embedded charging trigger function (CTF), collects charging information for network resource usage from a user plane function (UPF) concurrently with that resource usage in the UPF, during the PDU session. The network element then passes the charging information to a charging function (CHF). The CHF constructs charging data files or records based on the charging information, and then transfers the records to a billing domain for the purpose of subscriber billing after the PDU session has completed.

In contrast, online charging is a process in which charging information can affect, in real-time, the service rendered and, therefore, online charging employs a direct interaction of the charging process with the control of network resource usage. For online charging, charging information for network resource usage is collected concurrently with that resource usage in the same fashion as in offline charging; however, unlike offline charging, authorization for the network resource usage is obtained by the network prior to the actual resource usage.

A subscriber may use multiple (network) services in a PDU session. The multiple services may be subject to different costs and differential ratings or, alternatively, the same cost. The different services that are subject to the same cost and rating may be grouped into and identified by a rating group for use in both offline and online charging. The PDU session may include one or more rating groups each associated with one or more services. Generally, the offline and online charging may generate charging events (e.g., via the SMF) at the level of rating groups. The charging events depend on a configuration of various triggers and thresholds for the rating groups.

As mentioned above, there is no provision under the 3GPP provisions for the CHF to setup or arm triggers and thresholds, e.g., in the SMF, for offline charging events at the level of rating groups, at the stage of PDU session establishment (i.e., when a PDU session is being established), or post PDU session establishment; for example, when a rating group is being activated for the first time at the SMF, be it during PDU session establishment or post PDU session establishment, as a result of a policy control function (PCF) installing a new policy and charging control (PCC) rule with a fresh rating group at the SMF. Per 3GPP specification 32.255, there is a provision for the SMF to report rating groups to the CHF after the PDU session has been established, using a multipleUnitUsage information element (IE) in a message called the ChargingDataRequest-Update. In this case, however, since the CHF first learns of the rating groups via the ChargingDataRequest-Update only after the PDU session has been established and service usage is underway, only then does the CHF have the knowledge to arm triggers and thresholds for the rating groups in the SMF. For example, the CHF can only arm the triggers and thresholds in response to the ChargingDataRequest-Update from the SMF. This presents the followings drawbacks.

First, if there is a requirement to arm triggers and thresholds of rating groups instantly during/at the time of PDU session establishment, since the triggers and thresholds for the rating groups are not known "upfront" to the CHF when the PDU session is established, the CHF has to wait to learn the rating groups through receipt of a next ChargingDataRequest-Update from the SMF before the triggers and thresholds can be armed. Moreover, if the SMF does not have locally configured triggers and thresholds for the rating groups, the CHF has to wait even longer until general PDU session triggers/thresholds are met or until a next immediate charging trigger category event occurs. All of the foregoing conditions delay the ability of the CHF to arm the triggers and thresholds of the rating groups.

Second, to mitigate the above-mentioned delay, the SMF may have a local configuration of triggers and thresholds for the rating groups, so that the SMF can arm the triggers and thresholds at the stage of PDU session creation; however, provisioning the local configuration may be cumbersome because there may be a wide range of rating groups in any given deployment.

Third, if there is a requirement to arm different triggers and thresholds for different subscribers sharing the same rating group, it may be difficult to meet the requirement with the above-mentioned local configuration.

Embodiments presented below overcome the above mentioned problems and issues and offer advantages that are apparent from the ensuing description.

With reference to FIG. 1, there is shown a block diagram of various network elements of an example network 100 configured to support offline and online charging in accordance with embodiments presented herein. Network 100 may operate in accordance with the 3GPP specifications (e.g., network 100 may represent a 3GPP 5G network), except for enhancements or extensions provided to the 3GPP specifications in accordance with the embodiments presented herein. Network 100 includes a UPF 102 to forward flows of traffic between user equipment (UE) and a packet data network (PDN) (not shown in FIG. 1). Network 100 also includes a policy control function (PCF) 104, an SMF 106, a CHF 108, and a billing domain 110 collectively to control UPF 102 and implement the offline and online charging for services offered to the UE over the UPF. In the example of FIG. 1, SMF 106 and CHF 108 collectively represent a converged charging architecture that combines various functions associated with the offline and online charging. It is understood that the embodiments presented herein may also be implemented in a charging architecture that is not converged. Additionally, the embodiments are described in the context of 3GPP by way of example only. It is understood that the embodiments may also be implemented in the context of other types of networks.

The above-mentioned network elements of network 100 communicate over various interfaces. PCF 104 and UPF 102 communicate with SMF 106 over N7 and N4 interfaces, respectively. SMF 106 communicates with CHF 108 over an N40 interface. CHF 108 communicates with billing domain 110. Using the N7 interface, PCF 104 arms SMF 106 with PCC rules, as further described below. The PCC rules convey "ChargingData." The ChargingData includes information such as charging method (e.g., online and/or offline), rating group, and/or a service identifier. Using the N4 interface, SMF 106 and UPF 102 exchange traffic rules provisioning and usage reports.

Using the N40 interface, SMF 106 and CHF 108 exchange messages to achieve online and offline charging. The messages include a ChargingDataRequest message (referred to as "ChargingDataRequest") that flows in a direction from SMF→CHF, a ChargingDataResponse message (referred to as "ChargingDataResponse") that flows in a direction from CHF→SMF, and a ChargingNotifyReq message (referred to as "ChargingNotifyReq") that flows in the direction from CHF→SMF. The ChargingDataRequest and ChargingDataResponse (collectively referred to as "CDR" messages or simply "CDRs") that flow between SMF 106 and CHF 108 are further defined, respectively, as ChargingDataRequest-Initial and ChargingDataResponse-Initial (collectively referred to as "CDR-I"), when used for the first time that a charging service, e.g., offline charging for a given PDU sessions, is being activated. The ChargingDataRequest-Initial creates a charging data record for a user/subscriber at CHF 108. The ChargingDataRequest-Initial may also be used to request quota for a rating group (i.e. for online charging) if the charging service is an online service. After ChargingDataRequest-Initial has been sent, SMF 106 sends ChargingDataRequest-Update and receives ChargingDataResponse-Update (collectively referred to as "CDR-U"). The ChargingDataRequest/Response-Update may also be used to relay usage reports or request quota for new online services. For simplicity, the terms "Initial" and "Update" may be replaced with "I" and "U," respectively.

PCF 104 generates and provides to SMF 106 over the N7 interface PCC rules. The PCC rules include charging parameters (i.e., ChargingData) that govern charging during PDU sessions. The PCC rules can be activated, deactivated, and modified at any time during PDU session lifetimes. Each PCC rule (also referred to as a "charging rule") includes an identifier (ID) and a group of charging parameters. The charging parameters include, but are not limited to: a rating group, a charging method (e.g., offline or online), a measurement method, a reporting level, precedence, and the like. Multiple charging rules may include a same rating group. In other words, one rating group may correspond to one or more charging rules.

SMF 106 supports PDU connection/session establishment, modification, and/or release for UEs over UPF 102. With respect to charging, SMF 106 generates charging events towards CHF 108 based on observations of network resource usage by UEs in UPF 102, and based on triggers and thresholds configured in the SMF for the charging events. That is, SMF 106 collects the information pertaining to chargeable events from UPF 102 based on rating groups, triggers, thresholds, and so on, assembles the information into matching charging events, and sends the charging events to CHF 108. SMF 106 may embed a CTF to implement the aforementioned actions with respect to charging. CHF 108 generates charging data records based on the charging events received from SMF 106, and forwards the records to billing domain 110. Each charging data record represents a formatted collection of information about a chargeable event (e.g. time of PDU session establishment, duration of the PDU session, amount of data transferred, and so on).

Figure 2:
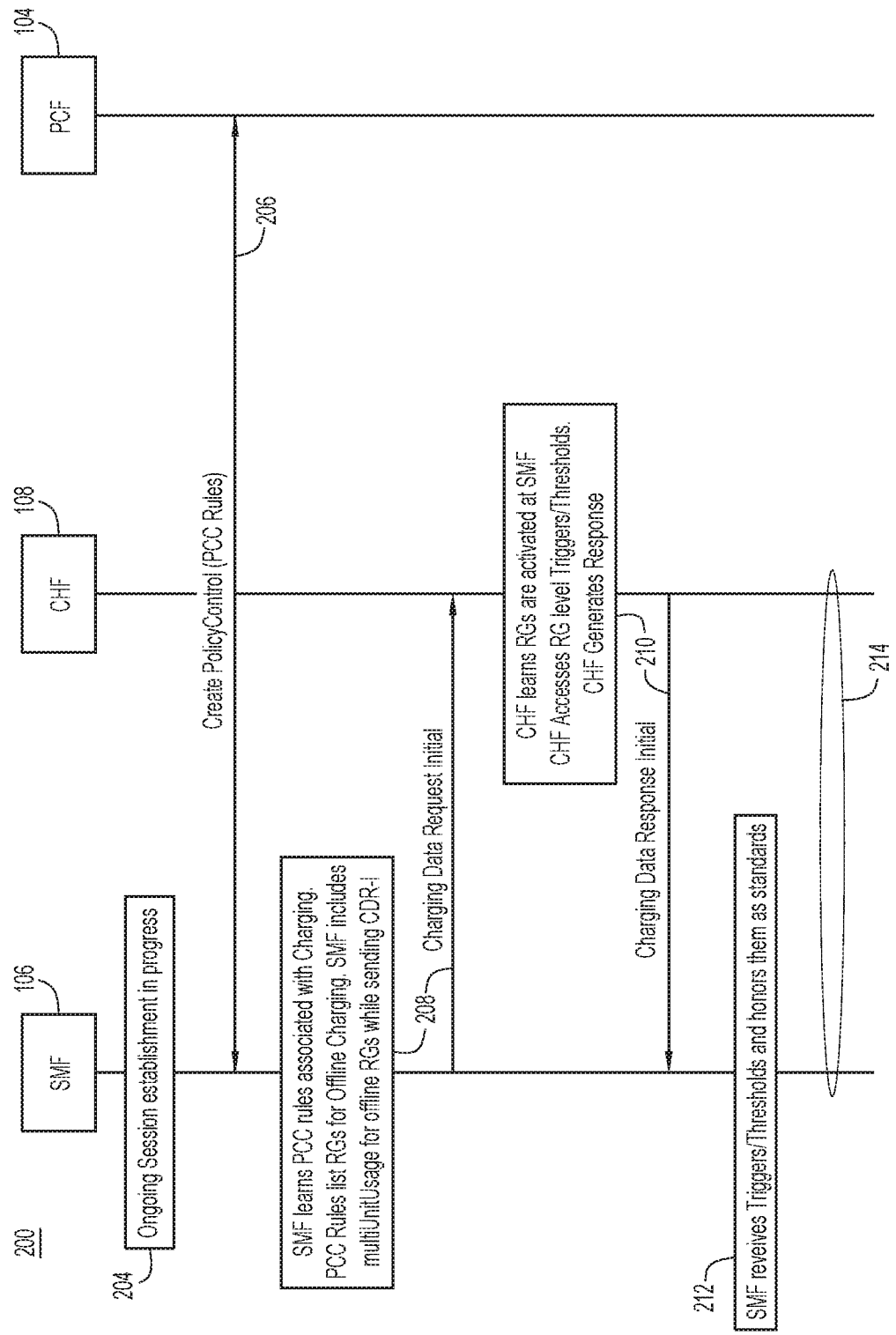
FIG. 2 is a transaction diagram for a message exchange used to notify a charging function in the network of offline rating groups during protocol data unit (PDU) session establishment, according to an example embodiment.

With reference to FIG. 2, there is shown an example transaction diagram 200 for a message exchange used to notify CHF 108 of offline rating groups during PDU session establishment. The aforementioned messages include ChargingDataRequest-Initial ("ChargingDataRequest-I") and ChargingDataResponse-Initial ("ChargingDataResponse-I"). Transaction diagram 200 and the aforementioned messages modify/extend the current 3GPP specifications, as described below.

At 204, SMF 106 is engaged in establishing a PDU session for UE with respect to UPF 102. That is, at 204, PDU session establishment is in-progress. Next operations 206-212 described below are performed during PDU session establishment and thus prior to when the PDU session has been established and prior to when the UE is using services via the PDU session.

At 206, PCF 104 sends to SMF 106 PCC rules that establish/indicate offline charging for the PDU session, and include various charging parameters associated with the offline charging/PDU session. The charging parameters include rating group information associated with the UE for the PDU session. The rating group information defines/indicates one or more rating groups for the UE/PDU session. In an example, PCF 104 may send the rating group information in a ratingGroup IE via a charging decisions— "ChgDecs" IE in a message referred to as a session management policy create response ("SMPolicyCreate response"), defined in the 3GPP specifications, for example.

At 208, SMF 106 receives the PCC rules from PCF 104 and is thus made aware of the rating groups associated with the relevant UE/policy and the PCC rules. In response, SMF 106 configures itself with the charging parameters conveyed by the PCC rules, and activates the rating groups. Also, in an extension to the 3GPP specifications, SMF 106 generates a "ChargingDataRequest-I" that includes the rating group information, and sends the "ChargingDataRequest-I" to CHF 108. That is, SMF 106 sends to CHF 108 rating group information, without any service usage information (e.g., without an indication of data consumption/usage) since there has been no service usage at this stage. In an example, SMF 106 may send the rating group information via a ratingGroup IE of a multipleUnitUsage IE of the ChargingDataRequest-I. An example of the multipleUnitUsage IE is shown in FIG. 7, described below. The multipleUnitUsage IE need not include its usedUnitContainer IE used to report service usage, since there has been no service usage. That is, the multipleUnitUsage IE may omit its usedUnitContainer IE.

At 210, CHF 108 receives the ChargingDataRequest-I from SMF 106 and thus learns of the one or more rating groups associated with the UE during the PDU session establishment. This local knowledge of the one or more rating groups enables CHF 108 to arm triggers and thresholds associated with/for the one or more rating groups, i.e., to arm rating-group specific triggers and thresholds in SMF 106. Thus, in response to the ChargingDataRequest-I, CHF 108 generates a ChargingDataResponse-I, populates the ChargingDataResponse-I with the triggers and the thresholds for the rating groups, and sends the ChargingDataResponse-I to SMF 106. The ChargingDataResponse-I includes the rating group information and the triggers and thresholds associated with the one or more rating groups indicated by the rating group information in the ChargingDataRequest-I.

At 212, SMF 106 receives the ChargingDataResponse-I including the triggers and thresholds for the one or more rating groups activated on the SMF. In response to receiving the ChargingDataResponse-I, SMF 106 applies the triggers and thresholds to the one or more rating groups.

At 214, the PDU session is established and service usage begins. Once the PDU session is established, responsive to the triggers and thresholds for the rating groups as configured on SMF 106 previously during the PDU session establishment, SMF 106 generates offline charging information for service usage by the UE in the PDU session (beginning with its commencement and without delay) at the granularity or level of the one or more rating groups, and forwards the charging information to CHF 108. CHF 108 generates charging data records based on the charging information and forwards the records to billing domain 110 for offline charging.

As a result of the above-described process by which CHF 108 arms the triggers and thresholds for the one or more rating groups in SMF 106 starting with PDU session establishment, the SMF advantageously avoids (i) the need for an a priori local configuration for the triggers and thresholds on the SMF, and (ii) delays in generating offline charging information for the one or more rating groups from the commencement of the PDU session.

Figure 3:
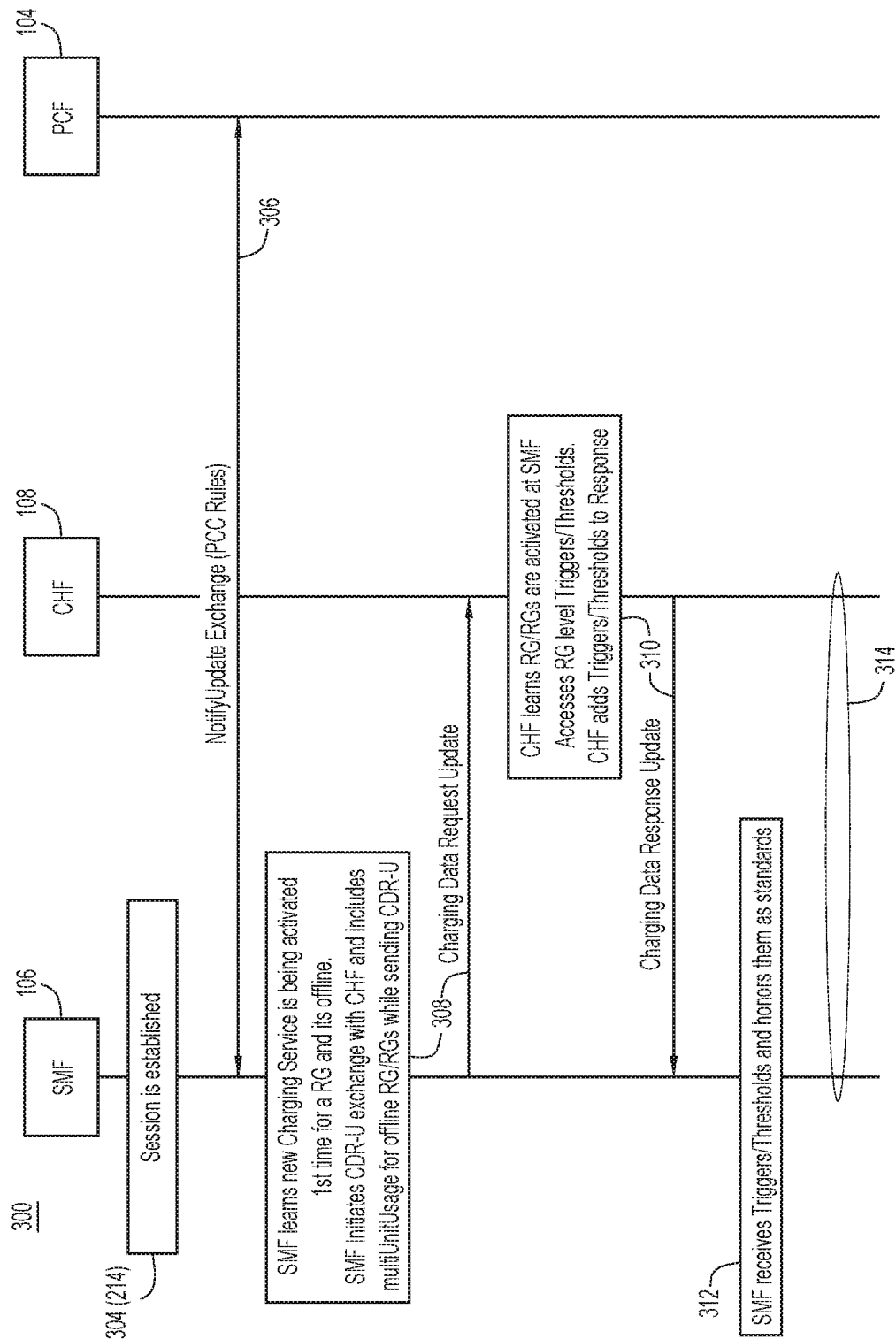
FIG. 3 is a transaction diagram for a message exchange used to notify the charging function of offline rating groups post PDU session establishment, according to an example embodiment.

With reference to FIG. 3 is an example transaction diagram 300 of an exchange of messages used to notify CHF 108 of offline rating groups after PDU session establishment, during an ongoing PDU session. The aforementioned messages include a ChargingDataRequest-Update ("ChargingDataRequest-U") and a ChargingDataResponse-Update ("ChargingDataResponse-U"). Transaction diagram 300 and the aforementioned messages modify/extend the current 3GPP specifications, as described below.

At 304, a PDU session (e.g., the PDU session described above in connection with FIG. 2) has been established, and service usage by the UE in the PDU session is underway.

At 306, (post PDU session establishment) PCF 104 configures additional PCC rules and, accordingly, provision one or more additional/new rating groups on SMF 106. Additionally, or alternatively, PCF 104 may modify one or more original rating groups associated with existing PCC rules. The aforementioned additional/new and/or modified one or more rating groups are referred to as one or more "updated" or "second" rating groups. In an example, PCF 104 sends updated rating group information indicating the one or more updated rating groups to SMF 106 via an SMPolicyControl-Update Notify procedure, for example.

At 308, SMF 106 receives the updated rating group information. In response, SMF 106 activates the one or more updated rating groups defined in the updated rating group information. Also, SMF 106 generates a ChargingDataRequest-U including the updated rating group information, and sends the ChargingDataRequest-U to CHF 108. That is, SMF 106 sends to CHF 108 the updated rating group information (e.g., a rating group which is new, i.e., for which there is no existing PCC rule which refers to the new rating group), without service usage information, since service usage for the one or more updated rating groups has not yet commenced. In an example, SMF 106 may send the updated rating group information via a ratingGroup IE of a multipleUnitUsage IE of the ChargingDataRequest-U. The multipleUnitUsage IE may omit its usedUnitContainer IE.

At 310, CHF 108 receives the ChargingDataRequest-U from SMF 106 and thus learns of the one or more updated rating groups from the updated rating group information. This enables CHF 108 to arm thresholds and triggers associated with/for the one or more updated rating groups, i.e., to arm rating-group specific triggers and thresholds in SMF 106. Thus, in response to the ChargingDataRequest-U, CHF 108 generates a ChargingDataResponse-U, populates the ChargingDataResponse-U with the triggers and the thresholds for the one or more updated rating groups, and sends the ChargingDataResponse-U to SMF 106.

At 312, SMF 106 receives the ChargingDataResponse-U including the triggers and thresholds for the one or more updated rating groups. In response to receiving the ChargingDataResponse-U, SMF 106 applies the triggers and thresholds to the one or more updated rating groups.

At 314, responsive to the triggers and thresholds for the one or more updated rating groups as configured on SMF 106 post session establishment, SMF 106 generates offline charging information for service usage by the UE in the PDU session at the granularity or level of the one or more updated rating groups, and forwards the charging information to CHF 108. CHF 108 generates CDRs based on the charging information and forwards the CDRs to the billing domain for offline charging.

Figure 4:
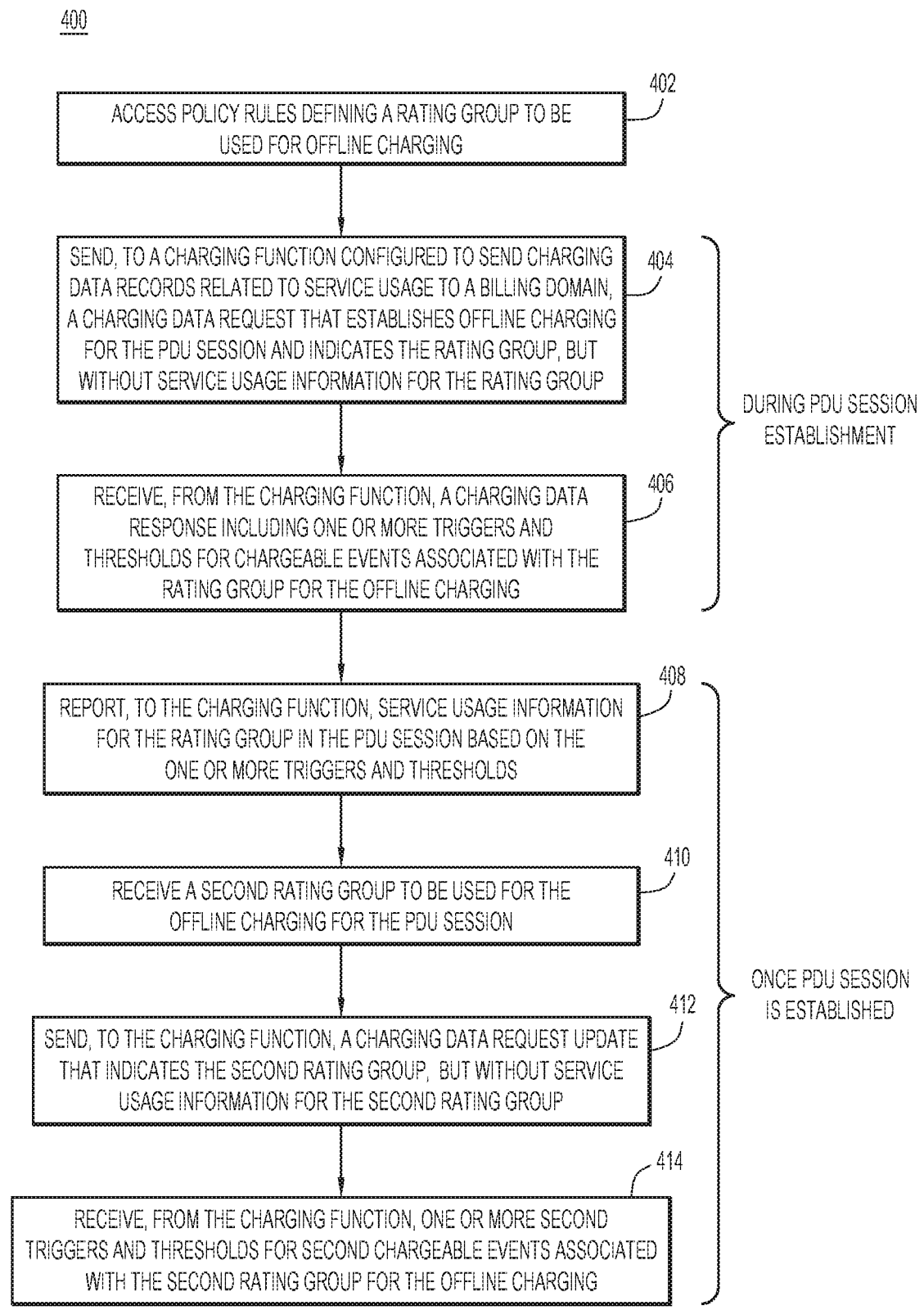
FIG. 4 is an illustration of a ChargingData message, according to an example embodiment.

With reference to FIG. 4, there is a flowchart of an example high-level method 400 of enabling rating group-level triggers and thresholds for offline charging that incorporates operations described above. Method 400 may be performed by a network element configured to support charging for services used during a PDU session. In an example, the network element includes an SMF having an embedded CTF and that interacts with a CHF. The CHF is configured to send charging data records related to service usage to a billing domain. The SMF and the CHF may operate in accordance with one or more 3GPP specifications/ standards.

At 402, the SMF accesses policy rules (e.g. PCC rules) defining a rating group to be used for offline charging. For example, the SMF receives PCC rules including rating group information from a PCF.

The SMF performs next operations 404 and 406 while a PDU session is being established with a UPF on behalf of UE, i.e., during PDU session establishment, and before service usage associated with the rating group. In an example, the SMF interacts with the UPF to establish the PDU session.

At 404, the SMF sends to the CHF an initial charging data request (e.g., ChargingDataRequest-Initial) that establishes offline charging for the PDU session and indicates the rating group, but does not include service usage information for the rating group. The CHF receives the initial charging data request and determines whether the charging data request includes service usage information. When the CHF determines that the charging data request does not include service usage information, the CHF sends to the SMF an initial charging data response (e.g., ChargingDataResponse-Initial) to include the one or more triggers and thresholds. In other words, absence of an indication of the service usage indicates to the CHF that the initial charging data request has been sent to report rating group information only, i.e., that rating groups have been enabled on the SMF, and so the CHF can return triggers and thresholds for those rating groups. That is, the CHF provisions triggers responsive to the initial charging data request without service usage information (e.g., without the usedUnitContainer IE).

At 406, the SMF receives, from the charging function, the initial charging data response including one or more triggers and thresholds for chargeable events associated with the rating group for the offline charging.

At 408, once the PDU session has been established and is active, the SMF reports to the charging function service usage information for the rating group in the PDU session based on the one or more triggers and thresholds.

At 410, the SMF receives an indication of a second/updated rating group in updated rating group information to be used for the offline charging for the PDU session. For example, the SMF may receive new PCC rules.

At 412, prior to service usage associated with the second rating group, the SMF sends to the charging function a charging data request update (e.g., ChargingDataRequest-Update) that indicates the second rating group, but not service usage information associated with the second rating group. The charging function interprets the absence of service usage information for the second rating group as a solicitation for trigger and thresholds for the second rating group. Thus, in response, the charging function sends to the SMF a charging data response update (e.g., ChargingDataResponse-Update) including one or more triggers and thresholds for the second rating group.

At 414, the SMF receives from the charging function the charging data response update including the one or more second triggers and thresholds for second chargeable events associated with the second rating group for the offline charging, and uses them to generate subsequent chargeable events for the second rating group.

Method 400 is described primarily from the perspective of the SMF. The method may also be described from the perspective of the CHF, in which case, while the PDU session is being established, the CHF receives the charging data request including rating group information, but without service usage information. The CHF determines whether the service usage information has been included. When the CHF determines that the service usage has not been included, the CHF responds to the charging data request with the charging data response that includes the triggers and the thresholds for the rating groups. On the other hand, if the CHF determines that the service usage information is included, the CHF does not return the triggers and thresholds in a charging data response, in other words, the CHF sends the charging data response without the triggers and the thresholds.

Figure 5:
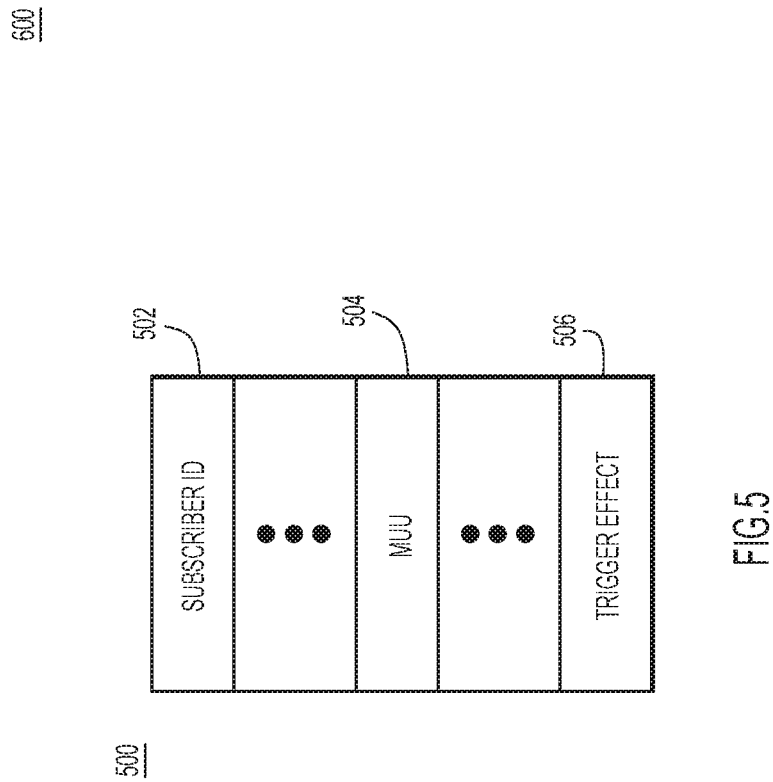
FIG. 5 is an illustration of an example ChargingDataRequest message, according to an example embodiment.

With reference to FIG. 5, there is an illustration of an example ChargingDataRequest 500. ChargingDataRequest 500 includes a subscriber identifier (ID) 502, a multipleUnitUsage (MUU) IE 504, and one or more identifiers of trigger/charging events 506. ChargingDataRequest 500 includes additional elements defined in 3GPP specification 32.291, for example.

Figure 6:
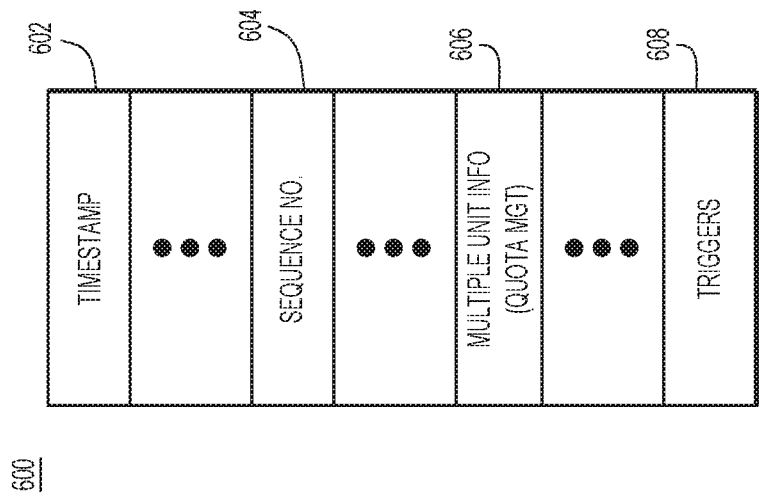
FIG. 6 is an illustration of an example ChargingDataResponse message, according to an example embodiment.

With reference to FIG. 6, there is an illustration of an example ChargingDataResponse 600. ChargingDataResponse 600 includes a timestamp 602, a sequence number 604, multiple unit information 606, and triggers and thresholds 608. ChargingDataResponse 600 includes additional elements defined in 3GPP specification 32.291, for example.

With reference to FIG. 7 is an illustration of an example multipleUnitUsage IE 700 (shown at 504 in FIG. 5), which may be configured to carry the information described above. multipleUnitUsage IE 700 includes a ratingGroup field 702 that indicates a rating group, a requestedUnit field 704 used for quota management, and a usedUnitContainer IE 706 that reports service usage for billing. As described above, usedUnitContainer IE 706 may be omitted from multipleUnitUsage IE 700 when the multipleUnitUsage IE is included in the ChargingDataRequest-Initial/Update.

FIG. 8 illustrates a hardware block diagram of a computing device 800 that may perform the functions of any of the servers or computing or control entities referred to herein in connection with an SMF or a CHF. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for control logic may be stored in memory 816 or persistent storage 818 for execution by processor(s) 814. Execution of the control logic causes the processors to implement/perform the operations and methods of the various embodiments described herein.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, for offline charging scenarios, heretofore, there has not been a mechanism for the CHF to provide the rating group-level triggers and thresholds upfront at the stage of PDU session creation. This is because the CHF has to wait until a next ChargingDataRequest-Update from the SMF or depend on the local configuration of the rating group-level triggers and thresholds at the SMF. So, there is a potential delay in meeting a CHF requirement to arm rating group-level triggers and thresholds instantly during PDU session creation. Also, local configuration of rating group-level triggers and thresholds at SMF could be cumbersome as there could be wide range of rating groups in a given service deployment.

Accordingly, in the embodiments presented herein, the SMF makes the CHF aware of the rating groups associated with the UE upfront at the stage of the PDU session creation and, accordingly, without any delay, the CHF can arm the rating group-level triggers and thresholds during the PDU session establishment and/or at PDU session modification post PDU session establishment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
   at a session management function (SMF) implemented on a computing device and configured to support charging for a service in a network, accessing, from a policy control function implemented on a computing device, policy rules defining a rating group to be used for offline charging; and
   while a protocol data unit (PDU) session for user equipment is being established in the network, and prior to service usage for the rating group in the PDU session:
      at the SMF, sending, to a charging function implemented on a computing device and configured to send charging data records related to the service usage to a billing domain, a charging data request that establishes offline charging for the PDU session and that indicates the rating group without any service usage information for the rating group, wherein the charging data request includes a multiple unit usage information element (IE) that has a rating group field to indicate the rating group, but that omits a used unit container IE normally used to report the service usage for billing;
      at the charging function, receiving the charging data request and, upon determining that the charging data request does not include service usage information, sending, to the SMF, a charging data response to include one or more triggers and thresholds for the rating group for chargeable events for the offline charging; and
      at the SMF, receiving, from the charging function, the charging data response.

2. The method of claim 1, further comprising, at the SMF:
   once the PDU session is established, reporting, to the charging function, the service usage information for the rating group in the PDU session based on the one or more triggers and thresholds.

3. The method of claim 1, wherein:
   the charging data request further includes a field for quota management.

4. The method of claim 1, wherein:
   the SMF includes an embedded charging trigger function to interact with the charging function.

5. The method of claim 1, further comprising, at the charging function:
   upon determining that the charging data request includes the service usage information, sending, to the SMF, a charging data response without the one or more triggers and thresholds.

6. The method of claim 1, further comprising, at the SMF:
once the PDU session is established, receiving a second rating group to be used for the offline charging for the PDU session; and
responsive to receiving the second rating group, and prior to service usage for the second rating group in the PDU session:
sending, to the charging function, a charging data request update that indicates the second rating group; and
receiving, from the charging function, one or more second triggers and thresholds for second chargeable events associated with the second rating group for the offline charging.

7. The method of claim 6, wherein sending the charging data request update includes sending the charging data request update without any service usage information for the second rating group.

8. The method of claim 1, wherein accessing includes receiving the policy rules from the policy control function.

9. The method of claim 8, wherein the SMF and the charging function are configured to operate in accordance with one or more 3rd Generation Partnership Project (3GPP) standards.

10. A system comprising:
a session management function (SMF) implemented on a computing device, the SMF configured to support charging for a service in a network, and to perform accessing, from a policy control function implemented on a computing device, policy rules defining a rating group to be used for offline charging; and
a charging function implemented on a computing device and configured to send charging data records related to service usage to a billing domain, wherein, while a protocol data unit (PDU) session for user equipment is being established in the network, and prior to service usage for the rating group in the PDU session:
the SMF is configured to perform sending, to the charging function, a charging data request that establishes offline charging for the PDU session and that indicates the rating group, wherein the charging data request includes a multiple unit usage information element (IE) that has a rating group field to indicate the rating group, but that omits a used unit container IE normally used to report the service usage for billing;
the charging function is configured to perform receiving the charging data request and, upon determining that the charging data request does not include service usage information, sending, to the SMF, a charging data response to include one or more triggers and thresholds for the rating group for chargeable events for the offline charging; and
the SMF is configured to perform receiving, from the charging function, the charging data response.

11. The system of claim 10, wherein the SMF is further configured to perform:
once the PDU session is established, reporting, to the charging function, the service usage information for the rating group in the PDU session based on the one or more triggers and thresholds.

12. The system of claim 10, wherein the charging data request further includes a field for quota management.

13. The system of claim 10, wherein the charging function is further configured to perform:
upon determining that the charging data request includes the service usage information, sending, to the SMF, a charging data response without the one or more triggers and thresholds.

14. The system of claim 10, wherein the SMF is further configured to perform:
once the PDU session is established, receiving a second rating group to be used for the offline charging for the PDU session; and
responsive to receiving the second rating group, and prior to service usage for the second rating group in the PDU session:
sending, to the charging function, a charging data request update that indicates the second rating group; and
receiving, from the charging function, one or more second triggers and thresholds for second chargeable events associated with the second rating group for the offline charging.

15. The system of claim 14, wherein the SMF is configured to perform sending the charging data request update by sending the charging data request update without any service usage information for the second rating group.

16. The system of claim 10, wherein the SMF is configured to perform accessing by receiving the policy rules from the policy control function.

17. The system of claim 16, wherein the SMF and the charging function are configured to operate in accordance with one or more 3rd Generation Partnership Project (3GPP) standards.

18. Non-transitory computer readable media encoded with instructions that, when executed by one or more processors, cause the one or more processors to perform:
at a session management function (SMF) implemented on a computing device and configured to support charging for a service in a network, accessing, from a policy control function implemented on a computing device, policy rules defining a rating group to be used for offline charging; and
while a protocol data unit (PDU) session for user equipment is being established in the network, and prior to service usage for the rating group in the PDU session:
at the SMF, sending, to a charging function implemented on a computing device and configured to send charging data records related to the service usage to a billing domain, a charging data request that establishes offline charging for the PDU session and that indicates the rating group without any service usage information for the rating group, wherein the charging data request includes a multiple unit usage information element (IE) that has a rating group field to indicate the rating group, but that omits a used unit container IE normally used to report the service usage for billing;
at the charging function, receiving the charging data request and, upon determining that the charging data request does not include service usage information, sending, to the SMF, a charging data response to include one or more triggers and thresholds for the rating group for chargeable events for the offline charging; and
at the SMF, receiving, from the charging function, the charging data response.

19. The non-transitory computer readable media of claim 18, further comprising instructions to cause the one or more processors to perform:

once the PDU session is established, reporting, to the charging function, the service usage information for the rating group in the PDU session based on the one or more triggers and thresholds.

20. The non-transitory computer readable media of claim 18, further comprising instructions to cause the one or more processors to perform:
at the charging function, upon determining that the charging data request includes the service usage information, sending, to the SMF, a charging data response without the one or more triggers and threshold.

\* \* \* \* \*